March 18, 1969     F. D. MOORE     3,433,421
VIBRATORY MILL AND ITS OPERATION
Filed July 25, 1966     Sheet _1_ of 6
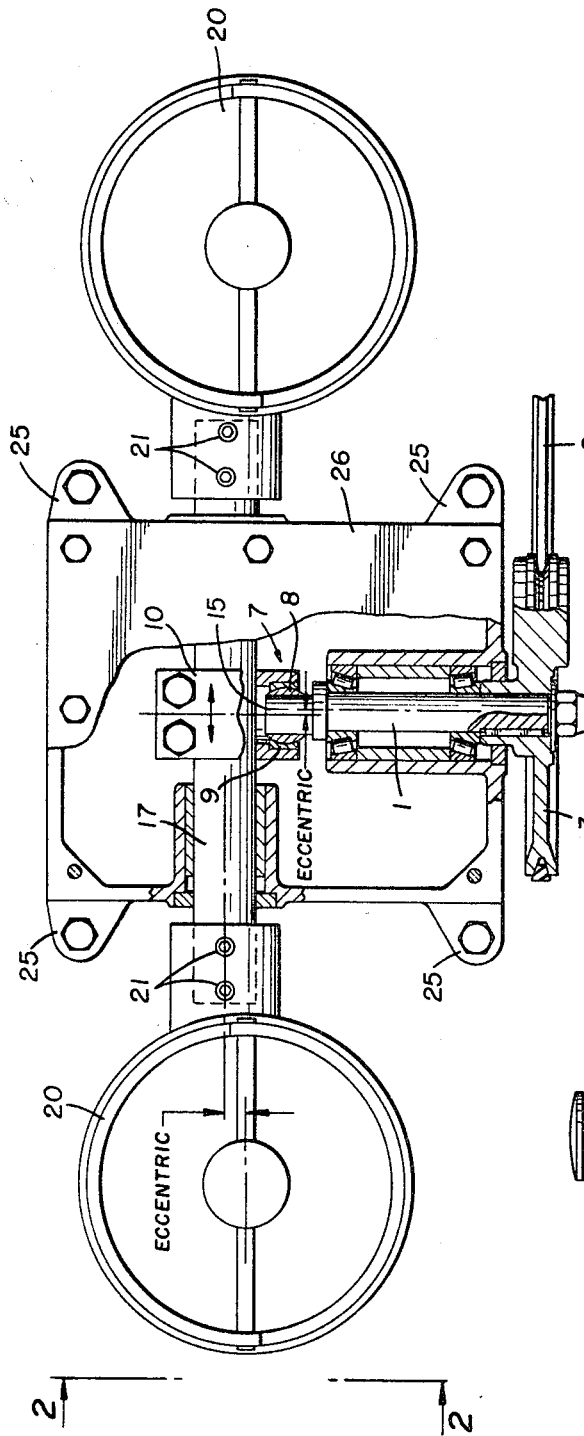
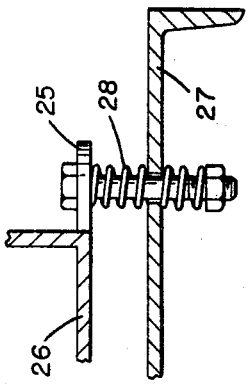
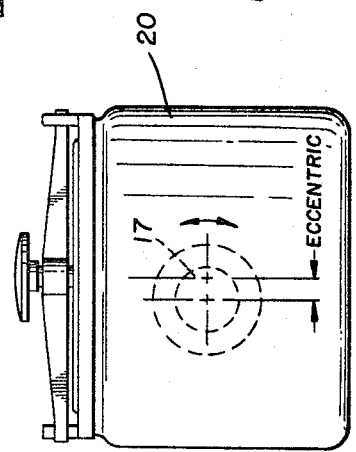
INVENTOR.
FRANK D. MOORE
BY
ATTORNEY X = 2 × THROW OF CRANK
Y = < X FOR DISTANCE < A
Y = X FOR DISTANCE A
Y = > X FOR DISTANCE > A

INVENTOR.
FRANK D. MOORE
BY
ATTORNEY

FIG. II

United States Patent Office 3,433,421
Patented Mar. 18, 1969

3,433,421
VIBRATORY MILL AND ITS OPERATION
Frank D. Moore, Tallmadge, Ohio, assignor, by mesne assignments, to U.S. Stoneware, Inc., a corporation of Massachusetts
Filed July 25, 1966, Ser. No. 567,727
U.S. Cl. 241—30         4 Claims
Int. Cl. B02c 2/04, 17/08; F16h 21/40

ABSTRACT OF THE DISCLOSURE

A vibratory mill and method of operation wherein a drum is mounted on a shaft by an eccentric operating in a ball joint secured to the shaft, driving the shaft through an orbit described by oscillative movement along and about the major axis of the shaft.

---

This invention relates to a vibratory mill and its operation.

Although it is possible to utilize a single container on a mill, utilizing the principle of this invention, the mill will be described more particularly as applied to the embodiment in which there are two containers, one at each end of a driven shaft, and the shaft is oscillated about its axis by a crank and may simultaneously be oscillated axially. This will be more particularly described herein.

Generally, the containers will be cylindrical although they might be circular or of other shape.

The container or containers include grinding media as well as the material to be ground. These media may be spherical or cylindrical or cubical or other shape, such that the mill might more generally be referred to as a ball-mill-type.

The driven shaft is oscillated about its axis. There is attached to it a ball-socket bearing, referred to herein more generally as a spherical bearing mounted in a knuckle which is mounted on the driven shaft. As the crank is rotated the spherical bearing describes a circle. The knuckle in which the bearing is enclosed causes the shaft-and-container assembly to oscillate about its axis. If the knuckle is mounted rigidly to the shaft, this assembly oscillates axially with the knuckle, but the assembly need not oscillate in this manner, and to prevent such motion the crank can be connected to the assembly through a Scottish yoke or equivalent means. The containers are mounted eccentrically with respect to the driven shaft and the orbit of the motion imparted to them is a projection of a circle or ellipse on a cylindrical surface. The grinding media within the containers have a motion different from the motion of the container, and the slippage between the two and the impingement of the media against themselves and the wall of the container, produces more rapid grinding than if the containers were mounted to rotate about their axes.

The invention is further described in connection with the accompanying drawings, in which—

FIGURE 1 is a plan view of equipment utilized to produce this novel grinding effect;

FIGURE 2 is a view of one of the containers on the line 2—2 of FIGURE 1;

FIGURE 3 is a detail illustrating how the equipment is mounted;

Figure 4:
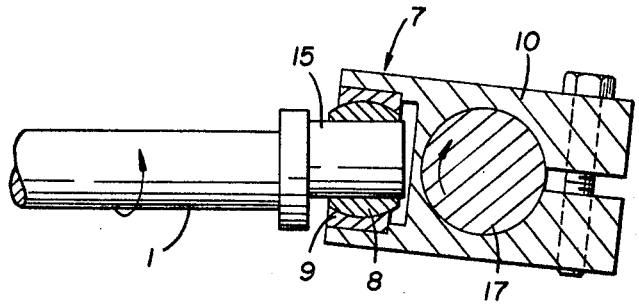
FIGURES 4 and 5 are elevations showing the relation of the crank to the shaft of the container assembly when the eccentric is in the up and down positions, respectively.

The apparatus includes a driving crank shaft 1 rotated by the belt 2 which operates on the sheave 3 attached to the crank shaft 1. The spherical bearing 7 comprising the ball 8 and socket 9 is mounted eccentrically with respect to the axis of the crank shaft 7 so that as it rotates the bearing 7 describes a circle.

Figure 5:
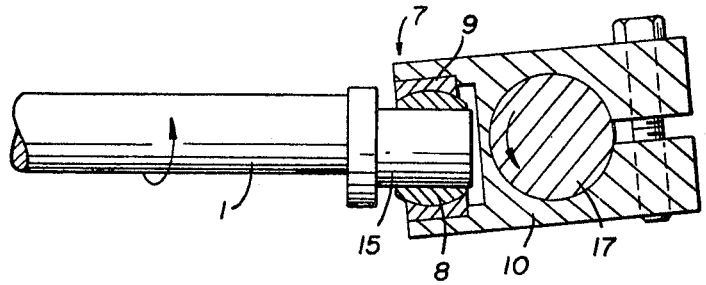

The knuckle 10 houses the bearing 7, and the bearing is free to rotate within it. The bearing 7 is mounted on the eccentric portion 15 of shaft 1 and transmits the eccentric motion of the crank shaft 1 to the driven shaft 17 which is clamped in the knuckle 10. As the shaft 15 rotates eccentrically, the knuckle 10 oscillates about the axis of the driven shaft 17 (FIGURES 4 and 5) and this causes the shaft 15 to move axially back and forth in respect to the ball 8 of the spherical bearing 7. Because the knuckle is connected rigidly to the shaft, the shaft oscillates axially. Such motion is not necessary and can be avoided by connecting the knuckle with the shaft by other means. The oscillation of the knuckle 10 oscillates shaft 17 about its axis as indicated by arrow y in FIGURE 7. The knuckle 10 is rigidly attached to shaft 17 and the eccentric rotation of the shaft 15 causes shaft 17 to oscillate axially as indicated by arrow x in FIGURE 7.

The containers 20 are mounted eccentrically with respect to the shaft 17 and, as shown in the drawings, they are held to the shaft by pins 21, although other means of mounting the containers on the ends of the shaft may be employed and the containers may be held at any desired angle to the axis of the shaft 17. By mounting the containers eccentrically a superior grinding action is obtained as will be explained in connection with the accompanying drawings and graphs.

The mill is preferably resiliently mounted, as by springs, and makes the motion of the containers more complex. This motion will vary with various resilient mounting arrangements. FIGURE 3 shows how ears 25 which project from the housing 26 may be supported from a rigid platform 27 by springs 28.

Figure 6:
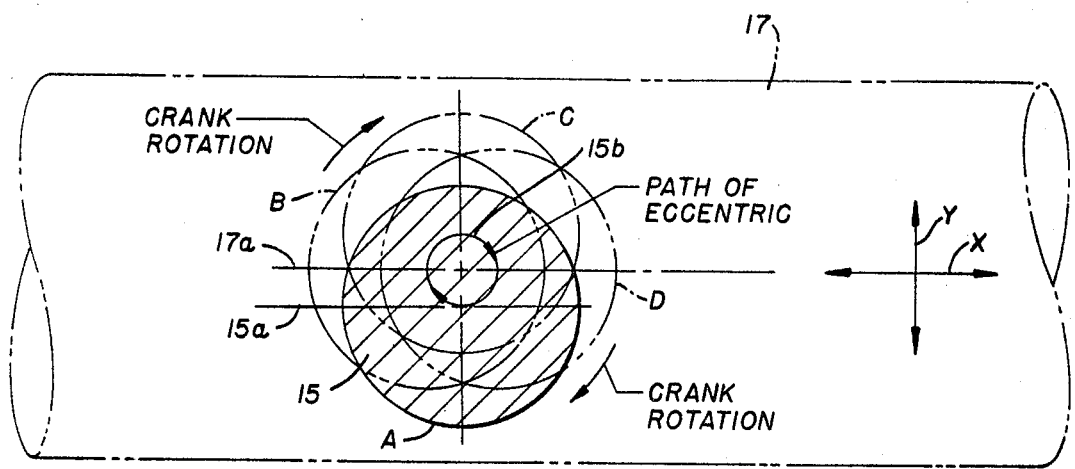
FIGURE 6 is a schematic showing of the motion of the crank with respect to the driven shaft on which the containers are mounted.

FIGURE 6 is a diagrammatic showing of the action of the eccentric 15 with respect to the shaft 17. The large arrows marked "Crank Rotation" suppose that the eccentric is moving clockwise. The change in position of the eccentric with respect to the shaft is illustrated by the letters A, B, C and D. The axis 17a of shaft 17 is stationary. As the eccentric rotates it moves first from the "down" position indicated by the letter A to the position indicated by the circle B, and thence to the positions indicated by the circles identified as C and then D. The centerline of eccentric portion 15 is marked 15a. The distance between 17a and 15a indicates the amplitude or throw of the crank 1. The circle 15b describes the path of the centerline of the eccentric as the crank rotates. The axial and oscillatory motions of the crank 17 are indicated by the arrows x and y.

Figure 7:
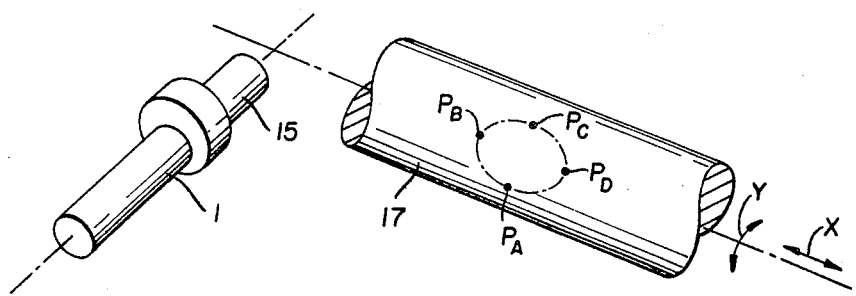
FIGURE 7 is a further explanatory showing of this relationship.
Figure 8A:
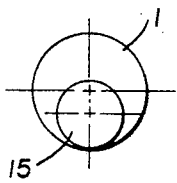
FIGURES 8A, 8B, 8C and 8D show different positions of the eccentric portion of the driving crank with respect to the balance of the driving crank at different stages in the cycle of the operation.
Figure 8B:
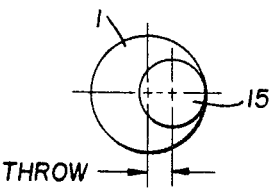
Figure 8C:
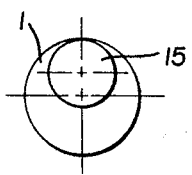
Figure 8D:
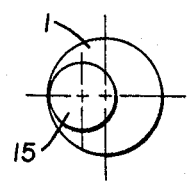

Whereas FIGURE 6 traces the path of the centerline of the eccentric 15 (viewed in cross section) through positions A, B, C and D, FIGURES 8A, 8B, 8C and 8D show the relative locations of the eccentric portion 15 and non-eccentric portion 1 of the crank shaft in the different positions A, B, C and D. (FIGURES 8A, 8B, 8C and 8D view the shaft from the opposite direction from that in which the positions of the eccentric and crank are shown in FIGURE 6.) In FIGURE 7 the change in the position of any point P on the surface of shaft 17 is shown. As the eccentric rotates through the positions A, B, C and D, the point is at the locations indicated as $P_A$, $P_B$, $P_C$ and $P_D$.

Figure 9:
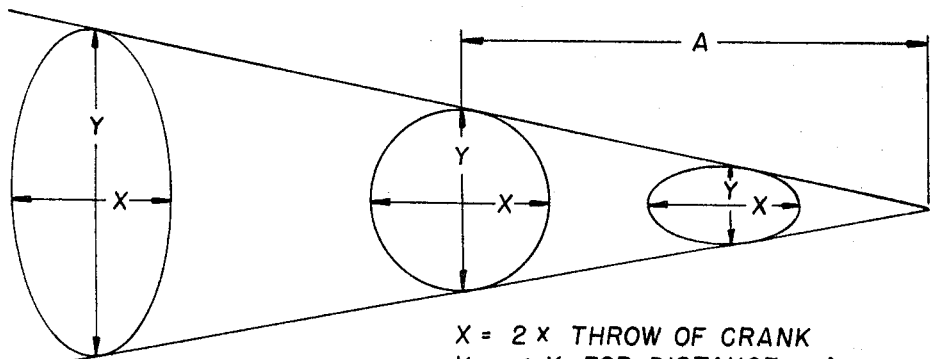
FIGURE 9 is a projection illustrating the motion of points located different distances from the center of the driving shaft.

FIGURE 9 shows projections of three different points at given distances from the axis of shaft 17, on any plane parallel to the axis of the shaft. X and Y represent the major and minor diameters of the oscillatory motion. Diameter X is a constant equal to twice the throw of the crank. Y increases proportionally with the distance from the axis of the shaft to the projection. Therefore, the following parameters are established: A is a distance where X and Y are equal, namely, a distance equal to the distance from the center of the shaft to the center of ball 8. Y is greater than X for distance greater than A. X is greater than Y for distances less than A.

Figure 10:
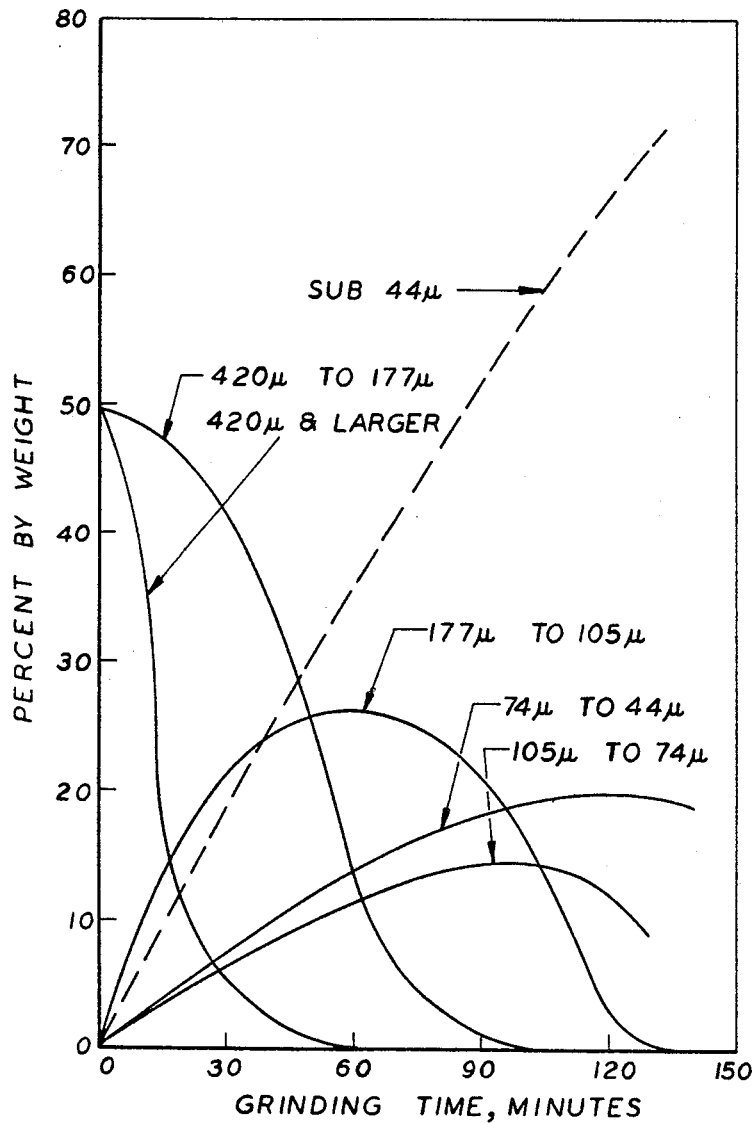
FIGURES 10 and 11 are graphs illustrating the effect of grinding in containers mounuted on center and eccentrically, respectively.
Figure 11:
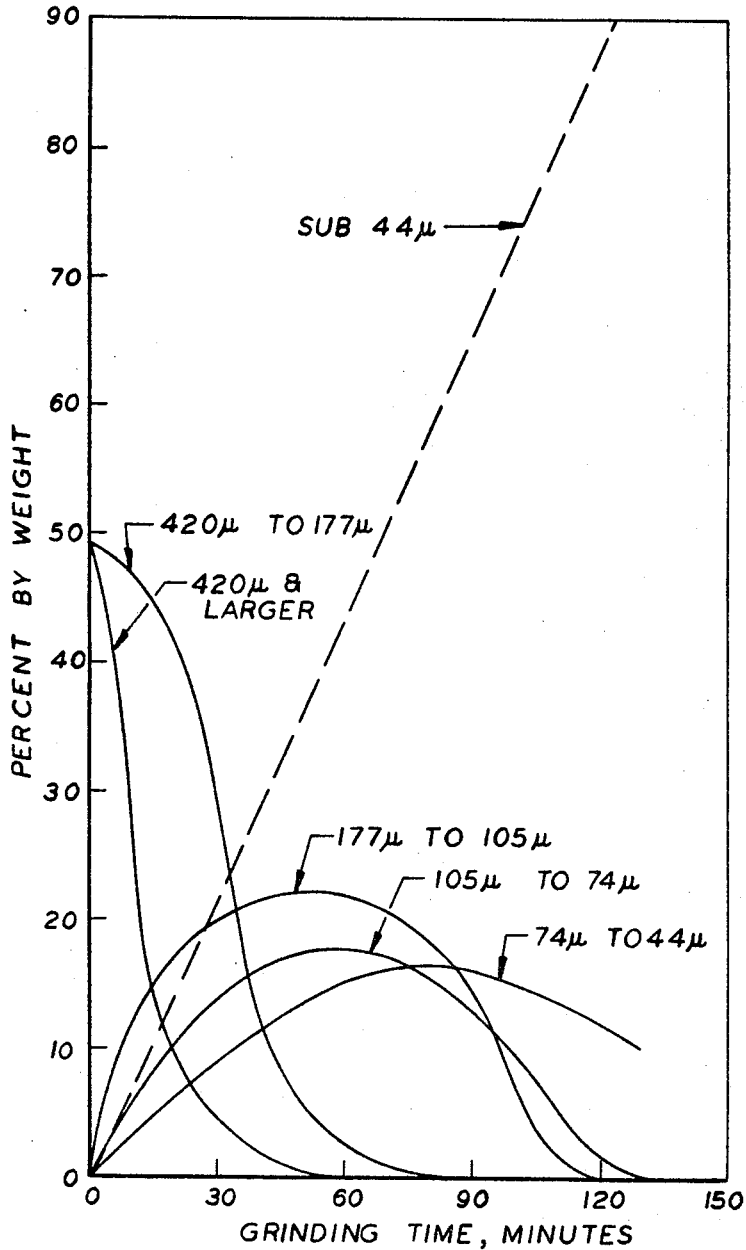
Figure 12:
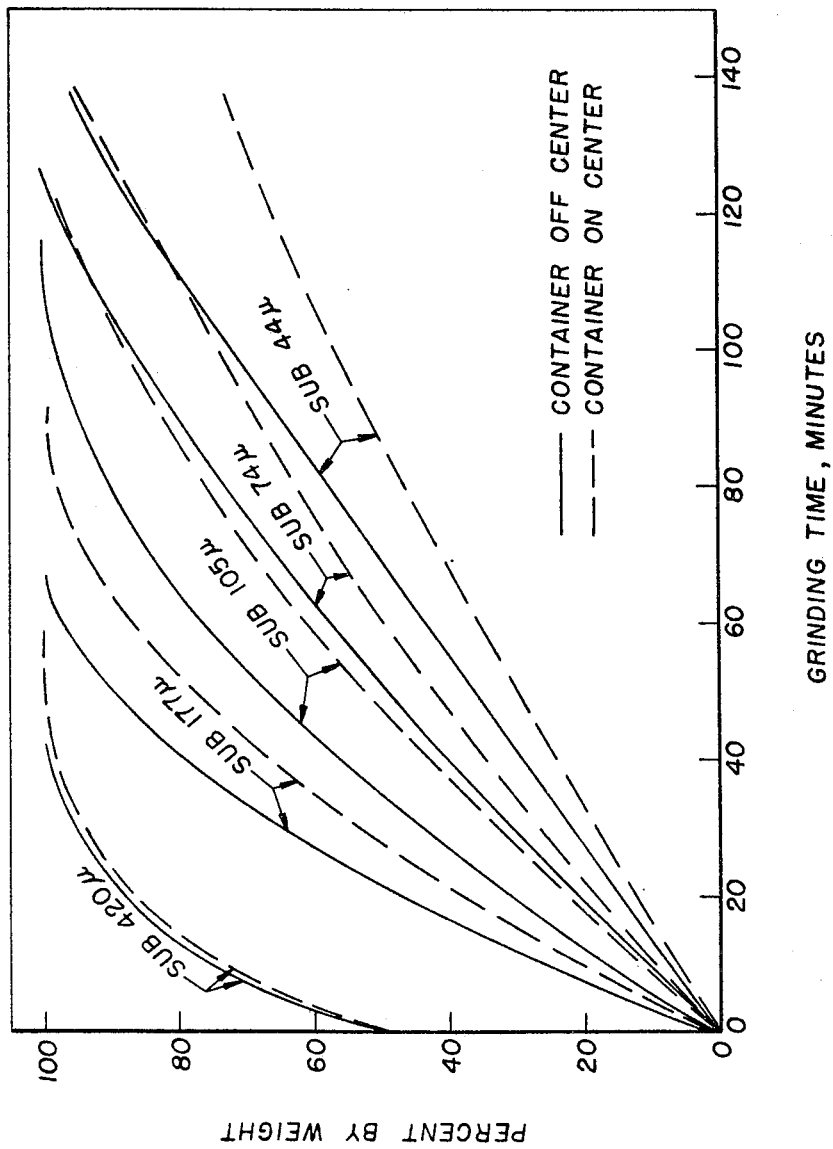
FIGURE 12 is a graph combining the actions illustrated in FIGURES 10 and 11.

FIGURES 10, 11 and 12 are graphs showing the superior grinding effect in containers 20 when such containers are mounted eccentrically at the ends of shaft 17 (FIGURE 11) as compared with the grinding effect when the containers are not mounted eccentrically (FIGURE 10), the curves of FIGURES 10 and 11, drawn in a different manner, being combined in FIGURE 12.

Each curve refers to the grinding of silica and with steel balls.

The curves on FIGURES 10 and 11 each represent a defined particle size range and indicate the percent by weight of each range at a given grinding time. At the start of each operation, 50 percent of the particles of the starting material measured 420 microns with nothing smaller than 177 microns, and this is reflected in the graph of all three figures. As the grinding progressed, the amounts of the smaller particles obtained increased, but the rate of increase was greater with the containers mounted eccentrically than with the containers mounted on center.

The curves on FIGURE 12 represent a particle size range that has only a maximum size limit and represent the percent by weight of each range at a given grinding time. It will be seen that any given amount of finer material was obtained much more rapidly in the container eccentrically mounted.

The invention is covered in the claims which follow.

I claim:

1. A vibratory mill comprising a drum mounted on a driven shaft; and means for driving said shaft through an orbit described by oscillative movement along and about the major axis of said driven shaft, comprising a rotatable member having an eccentric, and spherical bearing means secured to said driven shaft, receiving said eccentric.

2. The vibratory mill as defined in claim 1 in which the spherical bearing means attached to the shaft includes a ball-and-socket joint.

3. The vibratory mill as defined in claim 1 wherein said drum is mounted eccentrically on said shaft.

4. The method of grinding material in a vessel which contains freely movable grinding media, which method comprises oscillating the vessel eccentrically about its axis while simultaneously oscillating the vessel axially.

References Cited

UNITED STATES PATENTS

| | | | |
|---|---|---|---|
| 2,323,403 | 7/1943 | Jorgenson | 259—72 |
| 2,650,033 | 8/1953 | Ahlmann | 241—175 X |
| 3,037,327 | 6/1962 | Ferrara | 241—175 X |

ANDREW R. JUHASZ, *Primary Examiner.*

U.S. Cl. X.R.

74—23; 241—175; 259—72